Nov. 5, 1963 V. BOXER 3,109,937

DIODE PARAMETRIC AMPLIFIER UPCONVERTER

Filed Feb. 5, 1962

INVENTOR,
VICTOR BOXER.

BY Jack H. Linscott

ATTORNEY.

3,109,937
Patented Nov. 5, 1963

3,109,937
DIODE PARAMETRIC AMPLIFIER UPCONVERTER

Victor Boxer, Belmar, N.J., assignor to the United States of America as represented by the Secretary of the Army Filed Feb. 5, 1962, Ser. No. 171,323
2 Claims. (Cl. 307—88)
(Granted under Title 35, U.S. Code (1952), sec. 266)

The invention described herein may be manufactured and used by or for the Government for governmental purposes, without the payment of any royalty thereon.

This invention relates to amplifiers and particularly to parametric amplifiers. More particularly, this invention relates to subminiature, parametric amplifiers.

Parametric amplifiers are of considerable value because of their high gain, low noise, simplicity, and excellent performances at extremely high frequencies. However, parametric amplifiers require several tuned circuits, which necessitate several combinations of inductive and capacitive elements—or their equivalents—to function properly. For example, a parametric amplifier may have circuits tuned to the incoming signal frequency, the idler tank frequency, and the frequency of the source of pump energy.

It is an object of this invention to provide a parametric amplifier having an improved inductive coupling between elements for mixing purposes.

This object is accomplished by providing separate inductive elements for each of the tuned circuits of a parametric amplifier, using separate coils for each of the inductive elements, and winding all of these coils on a common toroidal core. This provides an adequate core permeability for all of the inductances, without the weight and cost of separate cores, and provides a closer coupling of the various signal frequencies for mixing purposes.

The actual mixing action is provided by a non-linear element, in this case a varactor diode, connected into the parametric amplifier to be common to all of the tuned circuits.

Figure 1:
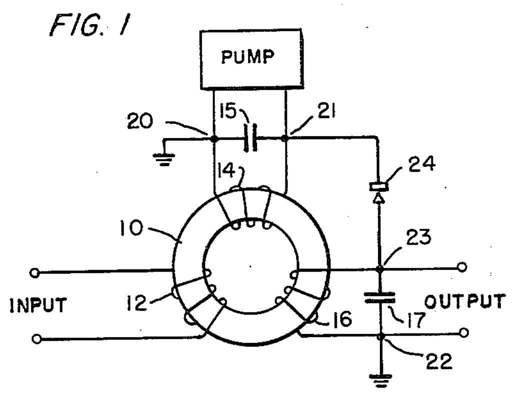
Figure 2:
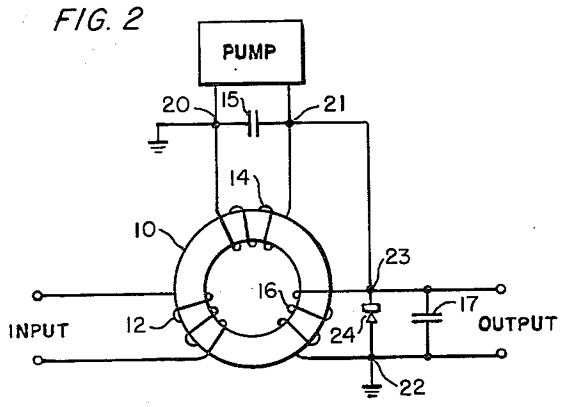

This invention will be better understood and other and further objects of this invention will become apparent from the following specification and the drawings, of which;

FIGURES 1 and 2 illustrate the conformation of the core and the windings, and the interconnection of the other elements of the amplifier.

Referring now more particularly to FIGURE 1 a toroidal core 10 has coils or windings 12, 14, and 16. Coil 12 is connected across the input terminals of the amplifier, coil 14 is connected to the terminals 20 and 21, across the condenser 15, and to the output of the pump. Coil 16 is connected to the terminals 22 and 23, across the condenser 17, and to the output terminals of the amplifier.

The varactor diode 24 is connected between the terminals 21 and 23 and the terminals 20 and 22 are connected to a common point, or are grounded.

In FIGURE 2, the elements are substantially the same and are similarly numbered. The toroidal core 10 has the same coils 12, 14, and 16 similarly connected to the input, to the pump, and to the output, respectively. The coils 14 and 16 are connected to the same terminals 20 through 23, and terminals 20 and 22 are grounded.

However, the varactor diode 24, in FIGURE 2, is connected between the terminals 22 and 23 instead of being connected between the terminals 21 and 23 as in FIGURE 1. Either way of connecting this diode provides the necessary non-linear function in the circuit to produce mixing and an amplified output.

The actual operation of this circuit is the same as that of a parametric amplifier, although most of the present day parametric amplifiers use wave guides and wave guide techniques for coupling and tuning the various elements of the circuit and they operate at substantially higher frequencies.

In operation, the input signal is applied to the coil 12, which may be tuned to the input frequency. The signal from the source of pump energy is applied by the pump to the coil 14, which is tuned to the pump frequency by means of the condenser 15. The common inductive coupling action of the core 10 induces the signal from one of the coils into all of the other coils so that both the input and pump signals are applied simultaneously to the varactor diode 24, in either of its locations. The varactor diode mixes the signals to form sum and difference frequencies which also appears in all of the coils. The circuit 16—17 is tuned to one of these frequencies, in this case the difference frequency, to form an idler tank to sustain the signals of this frequency.

The output is taken at this difference frequency, from the terminals across the coil 16, and will be at a higher level than the input in accordance with parametric amplifier principles.

In this invention, the signals are combined in the varactor diode in a well known manner, but they are brought together in the common toroidal core which insures a close coupling of the signals to improve the mixing action in the varactor diode.

In a typical embodiment of this invention, the core 10 has a .540 inch inside diameter, ¼ inch cross section and is made of a nickel-zinc ferrite of the Q–2 type (manufactured by the General Ceramics Corp. of Keasby, N.J.) having an initial permeability of 40 at 1 megacycle per second and a maximum permeability of 115. The coil 12 has 7 turns, the coil 14 has 2 turns, and the coil 16 has 30 turns, all of number 26 wires. The condensers 15 and 17 are of 27 and 47 micromicrofarads respectively, and the varactor diode is an SC70, manufactured by the Microwave Associates, of Burlington, Mass.

The pump is tuned to operate at 24 megacycles and may be any standard oscillator. The incoming signal is at about 6 megacycles, and the output, therefore, is taken at about 18 megacycles.

What is claimed is:

1. A parametric amplifier comprising a non-saturable, inductive, toroidal core having at least three coil windings; a source of input signals, at a first frequency, connected to a first of said windings; a source of pump energy, at a second frequency, connected to a second of said windings, tuned to said second frequency; means for tuning said third winding to the difference between said first and second frequencies; means for coupling a varactor diode to, for the generation of parametric oscillations, to said third winding; and means for coupling an output circuit to said third winding.

2. A parametric amplifier comprising non-saturable, inductive, a toroidal core having at least three coil windings, a source of input signals connected to a first of said windings, a source of pump energy connected to a second of said windings, a first condenser connected across said second winding and tuning said second winding to the frequency of said source of pump energy, a second condenser connected across said third winding and tuning said third winding to the differences between the frequency of said source of pump energy and the frequency of said source of input signal, a varactor diode connected between one end of each of said second and third windings, the other ends of each of said second and third windings being grounded, said varactor diode producing parametric oscillations in said amplifier, and means for coupling a utilization circuit to said third winding.

References Cited in the file of this patent

UNITED STATES PATENTS

| | | |
|---|---|---|
| 2,719,223 | Van der Ziel et al. | Sept. 27, 1955 |
| 3,012,203 | Tien | Dec. 5, 1961 |
| 3,018,443 | Bloom et al. | Jan. 23, 1962 |

OTHER REFERENCES

Landon: "RCA Review," September 1949, pages 387–396.